United States Patent Office 2,997,509
Patented Aug. 22, 1961

2,997,509
PRODUCTION OF CONJUGATED DIOLEFINS
Max Marin Wirth, Dollar, Scotland, assignor to British Hydrocarbon Chemicals Limited, London, England, a British company
No Drawing. Filed Mar. 27, 1959, Ser. No. 802,307
Claims priority, application Great Britain Apr. 9, 1958
5 Claims. (Cl. 260—681)

The present invention relates to the catalytic production of conjugated diolefines by the reaction of aldehydes with mono-olefines.

The condensation of mono-olefines with aldehydes is sometimes called the Prins reaction. Such condensation reactions are capable of yielding a variety of products such as m-dioxanes, unsaturated alcohols, 1:3-diols or conjugated diolefines depending on the reaction conditions employed. The production of conjugated diolefines by the reaction between mono-olefines and aldehydes has been carried out by means of a two-stage process, and by a one-stage vapour phase process. A variety of catalysts has been proposed for use in the one-stage reaction of which the best has appeared to be activated alumina. However, the yields of diolefine and efficiency of conversion of the starting materials have been low, owing apparently to the tendency of the diolefine to react with the aldehyde forming higher boiling condensation products, and also because of the decomposition of formaldehyde to give products such as carbon monoxide, so that the process has not represented an economic proposition on the industrial scale. Other catalysts which have been proposed for the single stage reaction include surface active earths and synthetic cracking catalysts but these catalysts show some inefficiency during the early part of the catalyst life.

According to the present invention, the process for the production of conjugated diolefines comprises reacting a lower mono-olefine with formaldehyde or acetaldehyde at an elevated temperature in the vapour phase in the presence as catalyst of a phosphate of an element from group IIIB of the periodic table.

The catalysts which may be used in the process of the invention are phosphates of elements from group IIIB of the periodic table. These elements are boron, aluminium, gallium, indium and thallium. Advantageously the catalyst is boron phosphate or aluminium phosphate and the use of boron phosphate is particularly preferred. The catalysts may be prepared in any suitable manner, and may be deposited if desired on a support. Suitable supports include silica, alumina, kieselguhr and surface active clays. The activity of the catalyst may decline slowly with continued use, owing largely to carbon deposition on the catalyst surface, and may be restored by reactivating at an elevated temperature in air or oxygen-containing gases. However, the selectivity of the catalyst for the production of diolefines remains at a high level.

The catalysts which are used in the process of the present invention have the advantage that the initial period of inefficiency does not occur, or is very greatly reduced. The catalysts, particularly boron phosphate, also have the advantage of producing a diolefine product of appreciably higher purity than earlier catalysts. In particular, isoprene is made containing much less methylbutenes, which are difficult and expensive to separate from isoprene.

The olefines which are suitable for use in the process of the present invention are the lower monoolefines having up to six carbon atoms, and particularly the tertiary olefines, i.e. olefines of the general formula $R_1R_2C=CHR_3$ where $R_1$ and $R_2$ are alkyl radicals, and $R_3$ is hydrogen or an alkyl radical. Olefines which isomerise under the reaction conditions to give tertiary olefines of the type $R_1R_2C=CHR_3$ may also be used. It is particularly preferred to use isobutene, 2-methylbutene-2, and 2-methylbutene-1. The molar proportion of olefine is preferably at least equal to that of the aldehyde used, and is suitably between 1 and 20 moles per mole of aldehyde.

The aldehydes which can be used in the process of the present invention are formaldehyde and acetaldehyde. The use of formaldehyde is preferred. Advantageously the formaldehyde is derived from commercial formalin which is a solution of 36 to 40% by weight of formaldehyde in water, usually containing some methanol. The formalin is vaporised and mixed with the lower mono-olefine before passing over the catalyst, and the steam in the gas mixture acts as a diluent. If desired other inert diluents may be used, such as nitrogen, carbon dioxide or hydrocarbons such as the lower paraffins. The proportion of inert diluent in the reaction gas mixture can vary widely, for instance up to about 95% by volume.

The reaction may be carried out over a wide range of temperatures, for instance between 150° and 400° C. It is preferred to use temperatures in the range 250° to 350° C. The space velocity of the reactants over the catalyst may likewise vary and is suitably between 0.1 and 50 expressed as moles of aldehyde per litre of catalyst per hour. The optimum velocity will vary depending on the reaction temperature, and on the age and activity of the catalyst, and it is preferred to use the higher values of space velocities in the range set out with the higher temperatures, and vice versa.

For the process according to the invention the known methods of vapour phase catalysis may be employed. The catalyst may be a stationary or moving bed or a fluidized bed method may be used.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene, from isobutene and formaldehyde.

The diolefines made in accordance with this invention are valuable chemical intermediates, for instance in the preparation of synthetic rubbers.

The process of the invention is further illustrated with reference to the following examples.

EXAMPLE 1

A catalyst consisting of boron phosphate deposited on silica gel was made up as follows:

Ten parts by weight of granular silica gel were stirred with a suspension of one part of crystalline boron phosphate powder in twenty parts of water and the mixture heated for 90 minutes at 550° C. The catalyst contained 10% of $BPO_4$.

A mixture of formaldehyde and steam, derived from formalin, and isobutene was passed over the catalyst at a temperature of 300° C., the reaction products being condensed and fractionally distilled to recover the isoprene. The reaction conditions and results over the first 4 hours are shown in Table 1, Run A. The exceptional purity of the $C_5$ product, which contained only 0.1% of methylbutenes, is noteworthy.

EXAMPLE 2

A catalyst consisting of boron phosphate deposited on silica was made up as follows:

A mixture of 4.7 parts by weight of crystalline boric acid and 8.2 parts of 90% ortho phosphoric acid in 50 parts of water was stirred into 72 parts of the silica gel used in Example 1. The impregnated silica gel was calcined at 350° C. for 3 hours. The catalyst contained 10% of $BPO_4$.

Isobutene and formaldehyde were reacted over the catalyst to form isoprene as described in Example 1. The reaction conditions and results over the first 4 hours are shown in Table 1, Run B.

EXAMPLE 3

A catalyst consisting of aluminium phosphate deposited on silica was made as follows:

29 parts by weight of aluminium nitrate was dissolved in 40 parts of water and this solution used to impregnate 80 parts of granular silica gel of the same type as in Example 1. The wet impregnated gel was exposed for several hours to ammonia vapours in order to precipitate aluminium hydroxide. The gel was then washed with water and dried for several hours at 110° C. This treated gel was then impregnated with a solution of 9 parts of 90% orthophosphoric acid in 40 parts of water and calcined for 4 hours at 550° C.

Isobutene and formaldehyde were reacted over the catalyst to form isoprene as described in Example 1. The reaction conditions and results over the first 4 hours are shown in Table 1, Run C.

Table 1

| Catalyst | Boron phosphate Silica | | Aluminium phosphate Silica |
|---|---|---|---|
| Run | A | B | C |
| Space velocity, moles total feed per litre catalyst per hour | 36 | 35 | 71 |
| Mole ratio, isobutene/formaldehyde | 3.5 | 3.7 | 3.4 |
| Formaldehyde conversion, percent | 34 | 49 | 78 |
| Isoprene formation, g./litre catalyst/hour | 39 | 52 | 90 |
| Efficiency of isoprene formation, percent | 57 | 53 | 28 |
| Methylbutenes in $C_5$ fraction, percent | 0.1 | 2.7 | 4.9 |

By way of comparison with the above examples when isobutene and formaldehyde were passed over untreated granular silica gel, used as carrier for the catalysts of Examples 1 to 3, under the conditions described in Example 1, only a trace of isoprene was detected in the reaction product in the fourth hour of reaction, only about 1% of the formaldehyde fed being converted.

EXAMPLE 4

This example illustrates the behaviour of the catalyst on regeneration. The catalyst used contained 10 percent by weight of boron phosphate, and was prepared by the method described in Example 1. Isobutene and formaldehyde were reacted over this catalyst as described in Example 1, the conditions used and results obtained being summarised in the following table. The catalyst was then regenerated by heating in a stream of air at 550° C. for one hour, and the reaction repeated with results shown in Table 2, the runs being carried out at atmospheric pressure and 300° C.

Table 2

| Run No. | A (Fresh Catalyst) | B (Regenerated Catalyst) |
|---|---|---|
| Space Velocity, moles total feed/litre catalyst/hour | 26 | 49 |
| Mole Ratio Isobutene/Formaldehyde in feed | 6.4 | 6.7 |
| Formaldehyde Conversion, percent | 68 | 46 |
| Isoprene formation rate, g./litre catalyst/hour | 54 | 87 |
| Efficiency of isoprene formation (based on reacted formaldehyde), percent | 66 | 84 |

EXAMPLE 5

This illustrates an alternative method of preparing the boron phosphate catalyst to give a product suitable for use in this reaction. This catalyst was prepared as follows. A sodium silicate solution was made by diluting 426 g. of commercial water-glass ($SiO_2/Na_2O$ content=3.2; $Na_2O$ content=9.42 wt. percent) to a volume of 2200 ml. This solution was then added with vigorous stirring at room temperature to a slurry of 100 g. of crystalline boron phosphate powder in 500 ml. of 2.2 normal hydrochloric acid. The gel was allowed to set, and base exchanged four times with 1% aqueous ammonium chloride solution, and finally washed five times with distilled water. The resulting gel was dried for 16 hours at 350° C., sieved free of fines and large particles and used in the reaction of isobutene and formaldehyde at atmospheric pressure and 300° C. as described in Example 1. Results and conditions used are shown in Table 3.

Table 3

Space velocity, moles total feed/litre catalyst/hour__ 37
Mole ratio isobutene/formaldehyde_____ 3.5
Formaldehyde conversion, percent_____ 36
Isoprene formation rate, g./litre catalyst/hour_____ 44
Efficiency of isoprene formation, percent (based on formaldehyde reacted)_____ 57
Methylbutenes content of $C_5$ (isoprene) fraction of product, percent_____ 0.1

EXAMPLE 6

This illustrates the use of a catalyst containing a very high proportion of boron phosphate. The catalyst was prepared as described in Example 2, but repeated impregnation followed by drying was necessary to produce the final product containing 45% by weight of boron phosphate. Isobutene and formaldehyde were reacted on this catalyst to form isoprene as described in Example 1 at 300° C. and 1 atmosphere total pressure, other conditions and the results being shown in Table 4.

Table 4

Space velocity, moles total feed/litre catalyst/hour__ 40
Mole ratio isobutene/formaldehyde_____ 4.1
Formaldehyde conversion, percent_____ 25
Isoprene formation rate, g./litre catalyst/hour_____ 39
Efficiency of isoprene formation, percent (based on formaldehyde reacted)_____ 70

EXAMPLE 7

This illustrates the use of the boron phosphate catalyst at various mole ratios of isobutene to formaldehyde in the feed, and in particular shows the relatively high efficiencies of formaldehyde utilisation obtainable with this catalyst at low isobutene/formaldehyde feed mole ratios. The catalyst used was prepared by the method described in Example 2, and used to react isobutene and formaldehyde at 300° C. with a total pressure of one atmosphere in the way described in Example 1. Other conditions and results are summarised in Table 5.

Table 5

| Run No. | A | B | C |
|---|---|---|---|
| Space velocity, moles total feed/litre catalyst/hour | 38 | 38 | 38 |
| Mole ratio, isobutene/formaldehyde | 8:1 | 4:1 | 2:1 |
| Formaldehyde mole fraction in feed | 0.08 | 0.08 | 0.08 |
| Formaldehyde conversion, percent | 45 to 30 | 32 to 17 | 21 to 11 |
| Efficiency of isoprene formation, percent (Based on formaldehyde reacted) | 75 to 90 | 80 to 90 | 70 to 80 |
| Isoprene formation rate, g./litre catalyst/hour | 72 to 50 | 50 to 30 | 33 to 18 |

The ranges given for conversion, isoprene efficiency and isoprene production rate are those found during the first 10 hours of catalyst life, the conversion and production rate declining and the efficiency increasing over that period.

I claim:

1. The process for the production of isoprene of high purity from isobutene and formaldehyde which comprises reacting the isobutene and formaldehyde at an elevated temperature in the range of 150° to 400° C. in the vapor phase in the presence of a combination condensation and dehydration catalyst consisting essentially of boron phosphate.

2. The process as claimed in claim 1 wherein the reaction is carried out at a temperature between 250° and 350° C.

3. The process as claimed in claim 1 wherein the space velocity of the reactants over the catalyst is between 0.1 and 50 mols of aldehyde per litre of catalyst per hour.

4. The process for the production of isoprene of high purity from isobutene and formaldehyde which comprises reacting the isobutene and formaldehyde at an elevated temperature in the range of 150° to 400° C. in the vapor phase in the presence of a combination condensation and dehydration catalyst consisting essentially of boron phosphate deposited on a support.

5. The process for the production of isoprene of high purity from isobutene and formaldehyde which comprises reacting the isobutene and formaldehyde at an elevated temperature in the range of 150° to 400° C. in the vapor phase in the presence of a combination condensation and dehydration catalyst consisting essentially of boron phosphate, the proportion of isobutene to formaldehyde being between 1:1 and 20:1.

References Cited in the file of this patent

UNITED STATES PATENTS

| | | |
|---|---|---|
| 2,350,485 | Arundale et al. | June 6, 1944 |
| 2,368,494 | Rosen et al. | Jan. 30, 1945 |
| 2,412,762 | Workman | Dec. 17, 1946 |

FOREIGN PATENTS

| | | |
|---|---|---|
| 589,709 | Great Britain | June 27, 1947 |